(12) United States Patent
Sano (10) Patent No.: US 8,836,817 B2
(45) Date of Patent: Sep. 16, 2014

(54) DATA PROCESSING APPARATUS, IMAGING APPARATUS, AND MEDIUM STORING DATA PROCESSING PROGRAM

(75) Inventor: Hisashi Sano, Tokyo (JP)

(73) Assignee: Nikon Corporation, Tokyo (JP)

( * ) Notice: Subject to any disclaimer, the term of this patent is extended or adjusted under 35 U.S.C. 154(b) by 473 days.

(21) Appl. No.: 12/320,057

(22) Filed: Jan. 15, 2009

(65) Prior Publication Data

US 2009/0185051 A1    Jul. 23, 2009

(30) Foreign Application Priority Data

Jan. 21, 2008    (JP) ................. 2008-010861

(51) Int. Cl.
| | |
|---|---|
| H04N 5/76 | (2006.01) |
| H04L 9/32 | (2006.01) |
| H04N 5/765 | (2006.01) |
| G06F 17/30 | (2006.01) |
| H04N 9/804 | (2006.01) |
| H04N 5/907 | (2006.01) |
| H04N 5/781 | (2006.01) |

(52) U.S. Cl.
CPC ............ *G06F 17/3028* (2013.01); *H04N 5/765* (2013.01); *H04N 9/8042* (2013.01); *H04N 5/907* (2013.01); *H04N 5/781* (2013.01)
USPC ....................... 348/231.2; 713/176

(58) Field of Classification Search
CPC .................... H04L 9/32; H04N 5/76
USPC ...................... 348/231.2, 231.3, 222.1, 220.1; 713/176, 181; 382/100; 707/698, 736, 707/741, 747
See application file for complete search history.

(56) References Cited

U.S. PATENT DOCUMENTS

| | | | | | |
|---|---|---|---|---|---|
| 5,050,212 | A | * | 9/1991 | Dyson ........................... | 713/187 |
| 6,557,102 | B1 | * | 4/2003 | Wong et al. ................... | 713/176 |
| 7,783,890 | B2 | * | 8/2010 | Watanabe ...................... | 713/181 |
| 2004/0119841 | A1 | * | 6/2004 | Shimizu ..................... | 348/222.1 |
| 2005/0007626 | A1 | * | 1/2005 | Takaiwa ....................... | 358/1.15 |
| 2005/0169499 | A1 | * | 8/2005 | Rodriguez et al. ............ | 382/100 |
| 2006/0036864 | A1 | * | 2/2006 | Parulski et al. ................ | 713/176 |
| 2006/0047967 | A1 | * | 3/2006 | Akhan et al. ................. | 713/176 |
| 2007/0052819 | A1 | * | 3/2007 | Nakao et al. ................ | 348/231.1 |

FOREIGN PATENT DOCUMENTS

| | | |
|---|---|---|
| JP | A-2003-6035 | 1/2003 |
| JP | A-2005-184046 | 7/2005 |

OTHER PUBLICATIONS

Dec. 13, 2011 Notification of Reasons for Refusal issued in Japanese Application No. 2008-010861 with English-language translation.

* cited by examiner

*Primary Examiner* — Twyler Haskins
*Assistant Examiner* — Akshay Trehan
(74) *Attorney, Agent, or Firm* — Oliff PLC (57) ABSTRACT

A data processing apparatus includes a data conversion part converting first data into second data, an identification data generation part generating identification data which depends on the first data, and a data processing part relating the identification data to the second data. Specifically, the data processing part adds the identification data to the second data.

10 Claims, 9 Drawing Sheets

| file name | Hush value |
|---|---|
| abc.NEF | HASH-123 |
| def.NEF | HASH-234 |
| ghi.NEF | HASH-345 |
| jkl.NEF | HASH-456 |
| mno.NEF | HASH-567 |
| pqr.NEF | HASH-678 |
| stu.NEF | HASH-789 |
| ⋮ | ⋮ |

DATA PROCESSING APPARATUS, IMAGING APPARATUS, AND MEDIUM STORING DATA PROCESSING PROGRAM

CROSS REFERENCE TO THE RELATED APPLICATIONS

This application is based upon and claims the benefit of priority from Japanese Patent Application No. 2008-010861, filed on Jan. 21, 2008, the entire contents of which are incorporated herein by reference.

BACKGROUND

1. Field

The present application relates to a data processing technique that makes data search easy.

2. Description of the Related Art

In the recent information society, various types of data such as images and audio are utilized. In particular, these types of data are utilized frequently by converting original data to generate new data. For example, taking image data of an electronic camera as an example, raw image data (RAW data) read out from an image sensor is converted into easily-handled JPEG data for use. Although the JPEG data is image data which has a small data size and can be handled easily compared to the RAW data, since the data size of an image is compressed to a data size of the minimum requirement, there is a problem that a gradient is lost easily when exposure, chroma, contrast, etc. of an image are adjusted using this JPEG data.

Accordingly, there is an electronic camera capable of storing the JPEG data and the RAW data which is the original of the JPEG data, as a JPEG file and a RAW file, respectively. In such an electronic camera, it is possible to read out the RAW file which is little degraded when the image adjustment of exposure, chroma, contrast, etc. is carried out according to a display device or a printer to be used, and to use the JPEG file when the image adjustment is not necessary.

However, when the image adjustment without the image quality degradation is required while an image of the JPEG file is displayed, it is necessary to carry out searching for the RAW file from which the JPEG file has been generated. For this purpose, it has been devised conventionally that the original RAW file can be identified from the JPEG file by providing the both files with the same file name but different extensions, or by storing the both files into the same folder in order to find the RAW file easily from the JPEG file.

Meanwhile, there is devised a method to utilize the JPEG file in which verification data is added to the JPEG data so as to identify the JPEG file, although it is originally devised for determining whether the data is modified or not (refer to, e.g., Japanese Unexamined Patent Application Publication No. 2005-184046).

However, there arise problems as follows in the conventional method which retains the JPEG file and the RAW file always in the same folder. First, when the JPEG file and the RAW file are stored in the same folder, the number of files is doubled compared to the number of image shootings and there arises a problem that file handling has vexatious complication, as images of the same shooting are displayed redundantly for file display of the folder or for display using image browser software.

Further, when an image of the same shooting is used in a plurality of folders, it is necessary to store the same JPEG files and RAW files into different folders redundantly, and there arises a problem that a memory size of a storage medium becomes huge.

For avoiding such problems, it is devised to search the RAW file when required, by storing the RAW files into a predetermined folder in one lump, without retaining the daily used JPEG file and the RAW file in the same folder.

However, for carrying out such searching, it is necessary to relate the JPEG file and the RAW file of the simultaneous shooting to each other. For example, if every image data is shot with the same digital camera, it is possible to carry out the shooting in a setting to make the file number to be a sequential number, and to search for the RAW image file using this information, but if the file name of the JPEG file is altered, there arises a problem that the search cannot be carried out. Moreover, when handling images shot by two or more kinds of digital cameras, it is difficult to administrate the images by the file names.

Alternatively, when the search is carried out for the simultaneously shot RAW image file from the JPEG image file, it is possible to carry out the search by referring to meta data such as a shooting date and time and information of the used camera, not by the file name. For a camera capable of high-speed consecutive shooting, however, it is necessary to store the detailed shooting date and time for distinguishing the file name, resulting in requiring a high precision storing means and increasing a data size to be stored. Further, when the search is carried out by referring to the meta data, there are various types of search information and it is a problem that the search processing has vexatious complication.

In this manner, a new technique is expected which administrates the RAW file in one lump and also searches for the RAW file of simultaneous shooting easily from the JPEG file. Note that, not limited to the image data, master data is necessary also for audio data when audio quality is desired to be changed by an equalizer or echo processing. Further, when general data is handled for software development which requires version management, there is also a case where it is necessary to refer to original data while data derived from the original data is used and there arises a problem similar to that in the case of the image data.

SUMMARY

A proposition of the present embodiments is to provide a data processing apparatus, an imaging apparatus, and a data processing program, capable of identifying the first data which is an original of the second data, easily from the second data which is generated from the first data by conversion.

A data processing apparatus includes a data conversion part converting the first data into the second data, an identification data generation part generating identification data depending on the first data, and a storing part storing the first data and the second data to which the data is added.

Specifically, the storing part stores the first data to a first file and the second data to which the identification data is added to a second file.

Specifically, the identification data is generated using a Hash function. Further, an imaging apparatus in which an imaging part is provided at the data processing apparatus wherein the imaging part outputs image data which is obtained by imaging an object to the data conversion part as the first data.

Specifically, the first data is RAW data which is imaged by the imaging part and is not subjected to image processing.

In addition, the identification data is generated using a Hash function. According to another aspect of the present embodiments, a data processing apparatus includes a searching part identifying the first data which is an original of the second data by use of identification data being added to the second data generated by another data processing apparatus having a data conversion part converting the first data into the second data, an identification data generation part generating the identification data depending on the first data, and a storing part storing the first data and the second data to which the identification data is added.

Further, a non-transitory compute-readable medium having compute-executable instructions for performing steps includes a data conversion step converting the first data into the second data, an identification data generation step generating identification data depending on the first data, and a storing step stores the first data to a first file and the second data to which the identification data is added to a second file.

In addition, the storing step stores the first data to a first file and the second data to which the identification data is added to a second data.

Specifically, the identification data is generated using a Hash function.

According to another aspect of the present embodiments, a non-transitory computer-readable medium having compute-executable instructions for performing a searching step identifying the first data which is an original of the second data by reading identification data being added to the second data generated by a data processing apparatus having a data conversion part converting the first data into the second data, an identification data generation part generating the identification data depending on the first data, and a storing part storing the first data and the second data to which the identification data is added.

According to the present embodiments, by relating the identification data depending on the first data to the second data generated from the first data by conversion, it is possible to identify the first data which is the original of the second data, easily from the second data.

DETAILED DESCRIPTION OF THE EMBODIMENTS

Hereinafter, embodiments will be described for a data processing apparatus, an imaging apparatus, and a data processing program.

First Embodiment

An imaging apparatus 101 according to a first embodiment will be described in detail with reference to the drawings.

Note that the imaging apparatus 101 according to the first embodiment includes a function of the data processing apparatus and a function of the data processing program.

Figure 1:
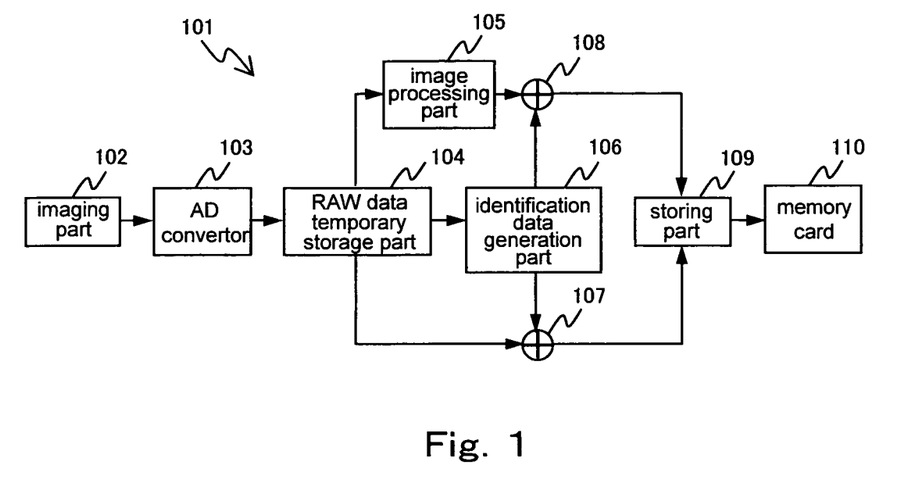
FIG. 1 is a block diagram of an imaging apparatus 101 according to a first embodiment.

FIG. 1 is a block diagram showing a configuration of the imaging apparatus 101 according to the present embodiment. The imaging apparatus 101 includes an imaging part 102, an AD convertor 103, a RAW data temporary storage part 104, an image processing part 105, an identification data generation part 106, data addition parts 107 and 108, a storing part 109, and a memory card 110. Note that FIG. 1 is a function bock diagram for achieving the imaging apparatus 101 according to the present embodiment and a control part controlling the entire imaging apparatus 101, an operation part for user's operation, power supply part, etc. are omitted from the drawing.

The imaging part 102 includes a shooting optical system, a CMOS type image sensor converting object light incident from the shooting optical system into an electrical signal, etc., and outputs the electrical signal converted by the image sensor to the AD convertor 103 when a user pushes a shutter release button of the imaging apparatus 101.

The AD convertor 103 converts the electrical signal of one screen, which is input from the imaging apparatus 101, into digital image data (RAW data), and outputs the RAW data to the RAW data temporary storage part 104. This RAW data is raw image data which is read out from the imaging part 102 and is not subjected to conversion.

The RAW data temporarily stored in the RAW data temporary storage part 104 is output to the image processing part 105, the identification data generation part 106, and the data addition part 107, respectively.

The image processing part 105 subjects the RAW data input from the RAW data temporary storage part 104 to color correction processing, image compression processing, etc. The present embodiment carries out the image compression by the JPEG standard for the image compression processing to generate JPEG data.

The identification data generation part 106 generates identification data by a predetermined method from the RAW data input from the RAW data temporary storage part 104. The present embodiment uses the Hash function, which is used widely for tamper proof, for an identification data generation method. The Hash function is a function for obtaining a representative numeral value of some data when the data is provided, and MD5 (Message Digest Algorithm 5), MD4, MD2, SHA (Secure Hash Algorithm), etc. are known for the function. In the present embodiment, the identification data generation part 106 uses MD5 of the Hash function and generates 128-bit identification data (Hash value) as digest data from the RAW data. Note that it is optional to use a Hash function other than MD5. After generating the identification data from the RAW data, the identification data generation part 106 outputs the generated identification data to the data addition part 107 and data addition part 108.

The data addition part 107 adds the identification data generated by the identification data generation part 106 to the RAW data stored temporarily in the RAW data temporary storage part 104 and outputs the data to the storing part 109.

The data addition part 108 adds the identification data generated by the identification data generation part 106 to the JPEG data subjected to the image processing by the image processing part 105 and outputs the data to the storing part 109.

The storing part 109 provides a file name to the JPEG data, to which the identification data is added, output from the data addition part 108, and stores the data into the memory card 110 as a JPEG file. Similarly, the storing part 109 provides a file name to the RAW data, to which the identification data is added, output from the data addition part 107, and stores the data into the memory card 110 as a RAW file. Here, the data which is provided with a file name and stored in the storage medium is called a file. Note that the imaging apparatus 101 may provide a serial number automatically for the file name, or the user may input the file name. In the present embodiment, the imaging apparatus 101 provides the file name automatically. In particular, the JPEG data generated from the RAW data at the first shooting is provided with the same file name as that of the RAW data, and then the JPEG data file is provided with an attribute "jpg" and the RAW data file is provided with an attribute "NEF". Note that, while the file name attribute "NEF" indicates the RAW data file, the attribute is not necessary to be "NEF" but to be another attribute name such as "RAW".

Figure 2:
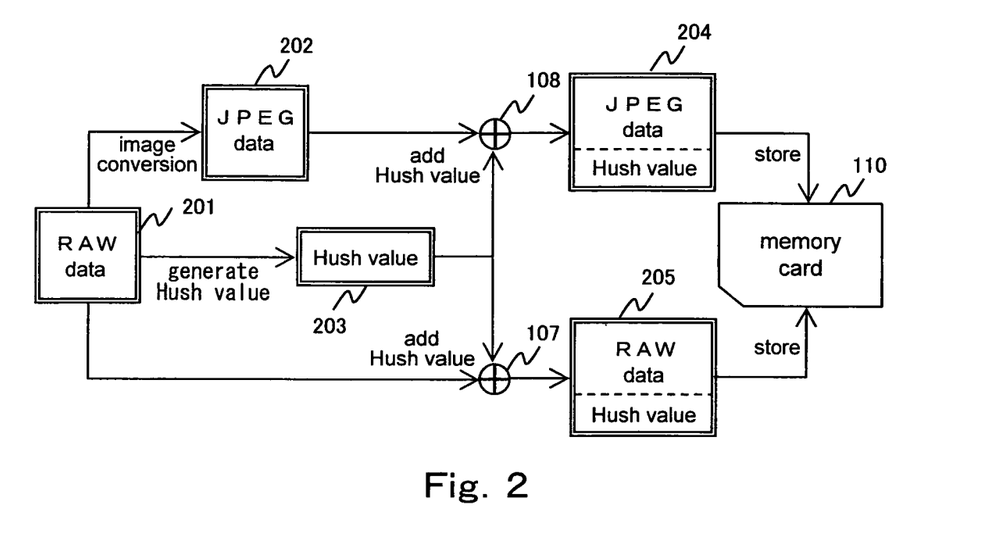
FIG. 2 is a block diagram showing a data flow.

Next, data processing flow will be described in detail with reference to FIG. 2. In FIG. 2, each block surrounded by a double line indicates a data stream. RAW data 201 is subjected to the image compression and the like by the image processing part 105 and converted into JPEG data 202. Further, from the RAW data 201, the identification data generation part 106 generates a Hash value 203, which is the identification data, using MD5.

The data addition part 108 adds the Hash value 203 to the JPEG data 202 and generates Hash value added JPEG data 204. On the other hand, the data addition part 107 adds the Hash value 203 to the RAW data 201 and generates Hash value added RAW data 205. Further, the generated Hash value added JPEG data 204 and Hash data added RAW data 205 are provided with the same file name automatically and stored into the memory card 110.

Figure 3:
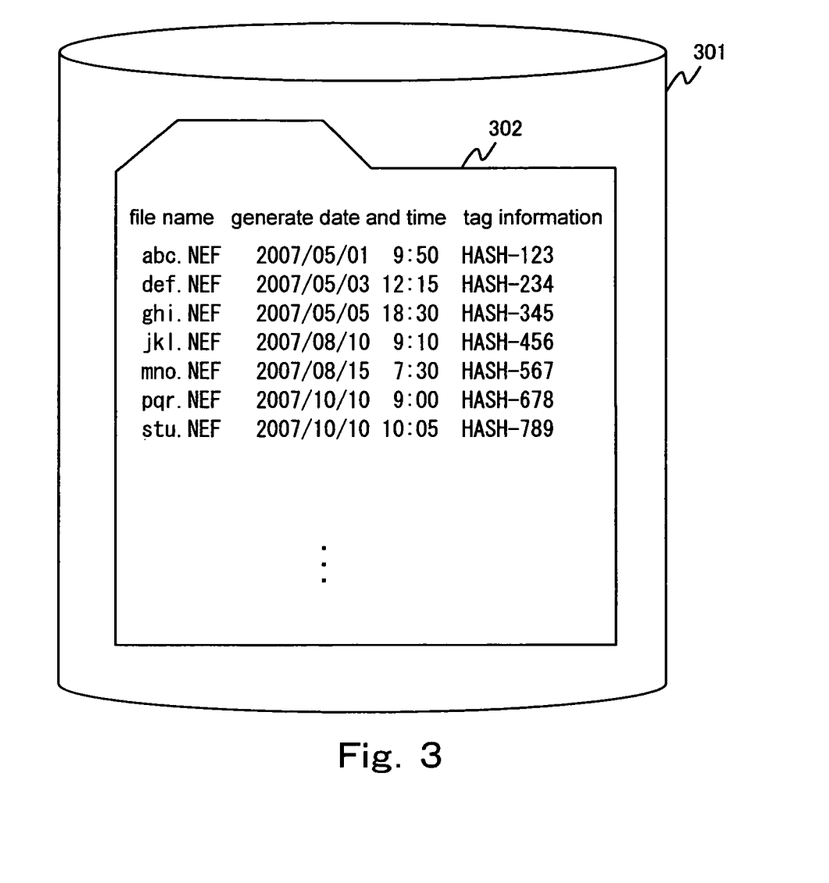
FIG. 3 is an explanatory diagram showing a stored state of RAW files.

Note that, when adding the Hash value 203 to the JPEG data 202, the data addition part 108 writes the 128-bit Hash value 203 into a Maker Note field of the Exif standard, for example, as tag information. Similarly, for the RAW data 201, the data addition parts 107 writes the 128-bit Hash value 203 as tag information using an information field of the Exif standard or a manufacturer unique file type. FIG. 3 is a diagram showing an example of the RAW file stored in a storage medium 301 such as the memory card 110 and a hard disk. FIG. 3 illustrates a state that the RAW files are stored in a folder 302 of the storage medium 301 in one lump. To each of the RAW files of FIG. 3, the unique identification data, which is generated by the identification data generation part 106 for each shooting in the imaging part 102, is added as the tag information. Note that, not limited to the tag information, the Hash value may be added automatically to the end of the file name.

Figure 4:
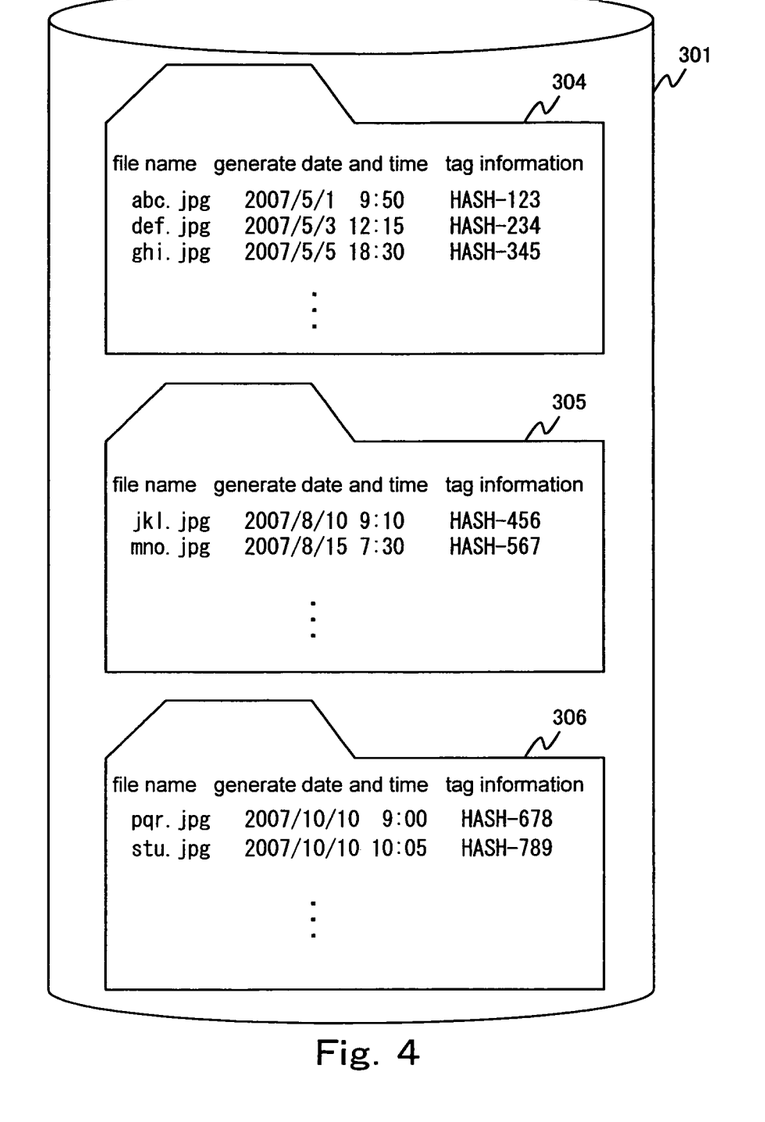
FIG. 4 is an explanatory diagram showing a stored state of JPEG files.

FIG. 4 is a diagram showing an example of the JPEG data stored in the storage medium 301 such as the memory card 110 or the hard disk. In FIG. 4, the storage medium 301 stores the JPEG data into a folder 304, 305, or 306 individually depending on a shooting category. The shooting category may be distinguished by, for example, a shooting date or an object such as a landscape and a person. Alternatively, for a system utilized by two or more kinds of cameras or a plurality of photographers in the mass media or the like, the shooting category may be a camera type or a photographer for distinguishing the storing folder or the storage medium.

For example, FIG. 4 shows an example of storing plural sets of the JPEG data separately into the folders which are distinguished by a shooting date as the shooting category. The folder 304 shows the JPEG data shot in May, the folder 305 shows the JPEG data shot in August, and the folder 306 shows the JPEG data shot in October. To each set of the JPEG data in FIG. 4, the unique identification data generated by the identification data generation part 106 from the RAW data, which is the original of the JPEG data, for each shooting in the imaging part 102, is added as the tag information.

Here, there is a case of requiring the original RAW data in order to carry out the image processing for the JPEG files stored in the folders 304, 305, and 306 of the storage medium 301 in FIG. 4. In this case, it is necessary to search the plurality of RAW files stored in the folder 302 of the storage medium 301 in FIG. 3 for the RAW file corresponding to this JPEG file.

In the present embodiment, as explained in FIG. 1 and FIG. 2, the RAW data 201, which is the original of the JPEG data 202, and the JPEG data 202 have the same Hash value 203 added thereto as the tag information and are stored in the JPEG file and the RAW file, respectively, and it is possible to search for the RAW file having the same Hash value as that of the JPEG file.

For example, there will be described a case of searching for the RAW file corresponding to the JPEG file (abc.jpg) of the folder 304 in the storage medium 301 of FIG. 4. The JPEG file (abc.jpg) has the Hash value HASH-123 added as the tag information, and the RAW file having the added Hash value HASH-123 is to be found from the folder 302 of FIG. 3 by the search. In the folder 302 of FIG. 3, the RAW file having the added Hash value HASH-123 is the RAW file (abc.NEF) and this is found to be the RAW file corresponding to the JPEG file (abc.jpg).

Here, in the above description, since the JPEG file (abc.jpg) and the RAW file (abc.NEF) have the same file name (abc), it is also possible to carry out the search using the file name, but it is difficult to carry out the search by the file name when the file name is intentionally altered in the generation of the JPEG file. As in the present embodiment, by adding the RAW data unique Hash value to the JPEG data as the tag information, when generating the JPEG data from the RAW data, it is possible to find the RAW file, which is the original of the JPEG file, easily by the search, even when the file name of the JPEG data is altered.

Figure 5:
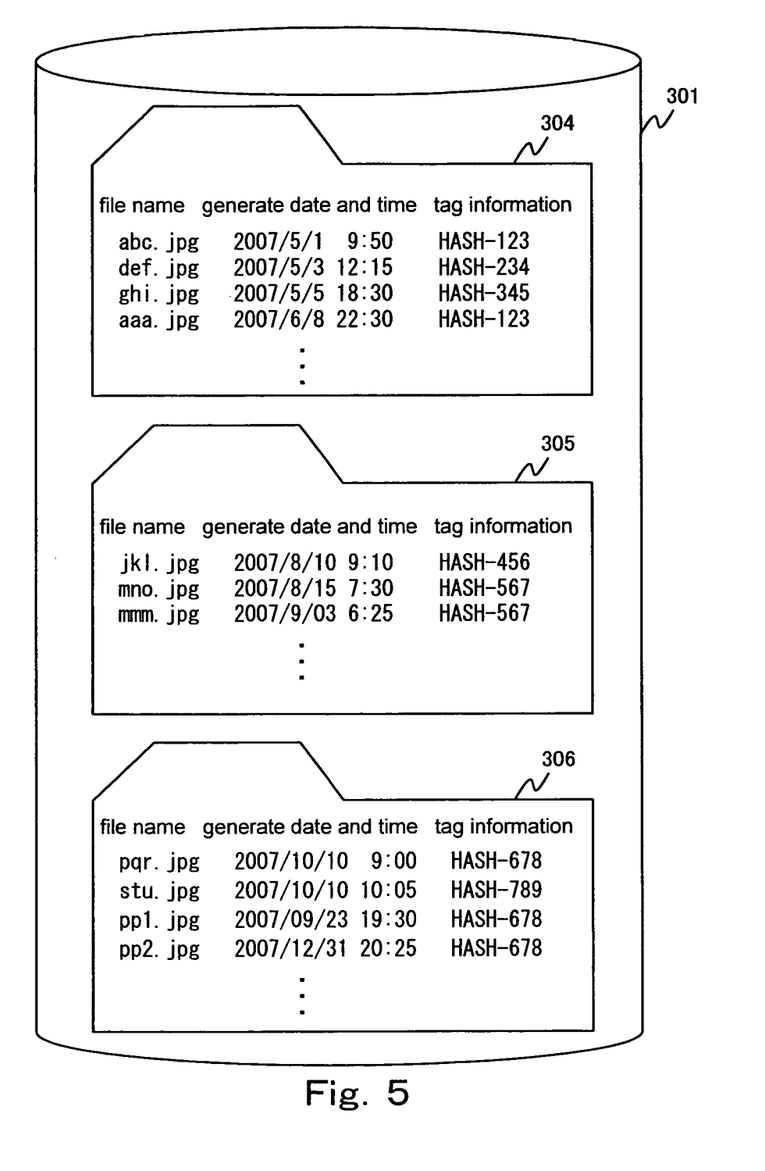
FIG. 5 is an explanatory diagram showing a stored state of the other JPEG files.

Further, even when the JPEG data is modified using image processing software or the like, or even when plural sets of the JPEG data are generated from the same RAW data, it is possible to search for the original RAW data easily. For example, FIG. 5 shows the folders 304, 305, and 306 storing the JPEG files described above with reference to FIG. 4. In addition to the JPEG files of FIG. 4, the JPEG file (aaa.jpg) is added to the folder 304, the JPEG file (mmm.jpg) is added to the folder 305, and the JPEG file (pp1.jpg) and the JPEG file (pp2.jpg) are added to the folder 306. For example, referring to the tag information of the JPEG file (aaa.jpg) in the folder 304, it is found that the Hash value HASH-123 is added thereto and the Hash value is the same as that of the JPEG file (abc.jpg). That is, it is found that the JPEG file (aaa.jpg) is modified from the JPEG file (abc.jpg) by the image processing software or the like, or the JPEG file (aaa.jpg) is another JPEG file generated from the original RAW file (abc.NEF) of FIG. 3 having the same Hash value.

Similarly, the Hash value HASH-567 of the JPEG file (mmm.jpg) in the folder 305 of FIG. 5 shows that the JPEG file (mmm.jpg) is generated either from the JPEG file (mno.jpg) having the same Hash value or from the original RAW file (mno.NEF) of FIG. 3 having the same Hash value.

Further, the Hash value HASH-678 of the JPEG file (pp1.jpg) in the folder 306 of FIG. 5 shows that the JPEG file (pp1.jpg) is generated either from the JPEG file (prq.jpg) having the same Hash value or from the original RAW file (prq.NEF) of FIG. 3 having the same Hash value. Similarly, the JPEG file (pp2.jpg) in the folder 306 is found to be the JPEG file derived from the same RAW file (prq.NEF).

In this manner, even when the JPEG file is stored in the folder or the storage medium different from that of the RAW file, it is possible to identify the original RAW file easily by the Hash value added to the JPEG file. In particular, even when the JPEG file name is different from the RAW file name, it is possible to identify the original RAW file easily by searching for the RAW file having the same Hash value as that added to the JPEG file.

Next, the data processing program will be described for the case that image processing software is used in a personal computer or the like with reference to the flow chart in FIG. 6. Note that, as a precondition, the folder storing the RAW file is assumed to be set already as an initial value for the data processing program. Further, the RAW file and the JPEG file handled by the data processing program are assumed to have the Hash value, which is generated as the identification data and added as the tag information thereto, when an image is shot by the imaging apparatus 101 described in the first embodiment, and assumed to be stored in the storage medium. In the following, the search processing for the RAW file will be described sequentially.

(Step S101) Activate the image processing software in a personal computer or the like and start the search processing for the RAW image.

(Step S102) Specify the JPEG file requiring the search for the RAW file thereof.

(Step S103) Recognize the tag information (Hash value) of the specified JPEG file.

(Step S104) Search the predetermined RAW file folder for the file having the same added Hash value as the Hash value recognized in Step S103. Here, details of the file search will be described below.

(Step S105) Open the RAW file identified by the search and display the image thereof.

(Step S106) Terminate the search processing.

Here, the file search flow in Step S104 will be described.

(Step S151) Sequentially read out the RAW file in the specified folder.

(Step S152) Extract the Hash value of the read-out RAW file.

(Step S153) Determine whether or not the extracted Hash value is the same as the Hash value recognized in Step S103. If the both Hash values are the same, return to Step S105. If the both Hash values are different, go to Step S154.

(Step S154) Determine whether or not all the RAW files in the specified folder have been read out. If all the RAW files have been read out, go to Step S155, and if all the RAW files have not been read out, return to Step S151 and read the next RAW file.

(Step S155) If the RAW file having the corresponding Hash value is not found even when all the RAW files have been read out, display "No corresponding file", and go to Step 106 to terminate the search processing.

In this manner, when the JPEG file displayed by the image processing software of the personal computer requires the image processing such as color conversion and the γ-conversion, it is possible easily to search for the RAW file which is the original of the JPEG file being displayed. As a result, it is possible easily to use the RAW data, which has little image degradation, in the image processing, and it is not necessary to search for the RAW file while confirming the file name or a generation date and time, resulting in better operationality.

In particular, it is not necessary to provide the same file name to the JPEG file and the RAW file, and it is possible easily to search for the RAW file which is the original of the JPEG file, even when the file name has been altered afterward.

Further, when the JPEG file and the RAW file are stored in the same folder so that correspondence therebetween may be known, conventionally it is also necessary to copy the RAW file every time the JPEG file is copied to another folder. Therefore, the RAW files are stored redundantly into the folder for each date "* year  month  date" and the folder for each purpose "* trip", which are different in the shooting category, for example, and a huge size storage medium is required. On the other hand, in the present embodiment, only the small size JPEG file may be stored in the folders which are different in the shooting category, and it is possible to store the large size RAW file in one folder in one lump. As a result, it is sufficient to use only one huge size, such as 5 MB to 10 MB, RAW file which is usually ten times or more larger than the JPEG file, and it is possible to suppress useless consumption of the memory size and to reduce the memory size to the minimum requirement.

Note that, while the data processing program of the personal computer is described above, the present embodiment may be applied to a dedicated data processing apparatus using an integrated circuit such as an ASIC which achieves the same processing.

Further, while the above description explains the case of using the image data such as the JPEG data and the RAW data, the same effect can be obtained in a case of audio data such as music. For example, an audio file A is generated from the audio data of recorded master data by addition of unique identification data which is generated from the audio data, and the audio file A is stored. Further, the same identification data is also added to an audio file B, which is obtained from the audio file by the equalizer, the echo processing, or the like, and the audio file B is stored. When search for the audio file A is required for the audio file B afterward, it is possible easily to find the audio file A by searching for the audio file, which has the same identification data as the identification data added to the audio file B. Further, it is possible to apply the present embodiment for correspondence between the files, which are converted into audio data having different formats such as WAV type and MP3 type, to each other.

Further, in software development which requires version management, program data of the first version is provided with additional unique identification data, which is generated from this program data, and is stored, and when the original program data is required to be referred to during the use of program data derived from the original program data, it is possible easily to search for the original program data having the same added identification data, as in the case of the image data described above.

Note that, while the first embodiment adds the RAW data unique Hash value, which is generated from the RAW data, to the JPEG data, this method may be applied to a case of generating the JPEG data from non-compression BMP data (bit map data) or a case of generating a file converted into the GIF data type or the TIF data type from the JPEG data. In this case, the JPEG unique identification data generated from the JPEG data, which is the original of the GIF data type or the TIF data type, is added to the GIF data or the TIF data. Note that it is optional to carry over the RAW data unique Hash value, which is the original of the JPEG data, to the GIF data or the TIF data.

That is, when the second data is generated from the first data, the first data unique identification data, which is generated from the first data, is added to the first data and the second data, which are stored as the first file and the second file, respectively. Then, the present embodiment can be used in search for the first file from the second file.

Second Embodiment

Next, an imaging apparatus 401 according to a second embodiment will be described in detail with reference to FIG. 7. Note that the imaging apparatus 401 according to the second embodiment includes the function of the data processing apparatus and the function of the data processing program.

Figure 7:
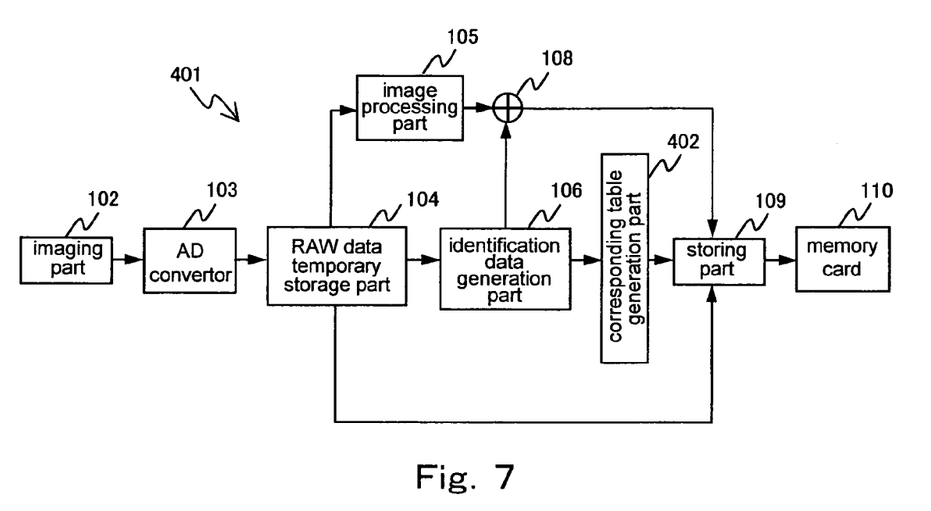
FIG. 7 is a block diagram of an imaging apparatus 401 according to a second embodiment.

FIG. 7 is a block diagram showing a configuration of the imaging apparatus 401 according to the present embodiment. Note that, in FIG. 7, the component having the same symbol as that of the imaging apparatus 101 shown in FIG. 1 of the first embodiment indicates the same component and repeated description thereof will be omitted. A different point from FIG. 1 is that a corresponding table generation part 402 is provided. Note that a control part controlling the entire imaging apparatus 401 and an operation part for user's operation, a power supply part, etc. are omitted from the drawing as in FIG. 1.

As in the first embodiment, an image shot by the imaging part 102 is stored temporarily in the RAW data temporary storage part 104 via the AD convertor 103, and the RAW data stored temporarily in the RAW data temporary storage part 104 is output to the image processing part 105 and the identification data generation part 106.

The image processing part 105 subjects the RAW data, which is input from the RAW data temporary storage part 104, to color correction processing, image compression processing, etc., and then generates the JPEG data by carrying out the image compression by the JPEG standard for the image compression processing and outputs the data to the data addition part 108.

The identification data generation part 106 generates the 128-bit identification data (Hash value) from the RAW data input from the RAW data temporary storage part 104 using the MD5 Hash function as in the first embodiment. The generated identification data is output to the data addition part 108 and the corresponding table generation part 402.

The data addition part 108 adds the identification data generated by the identification data generation part 106 to the RAW data temporarily stored in the RAW data temporary storage part 104, and output the data to the storing part 109.

Figure 8:
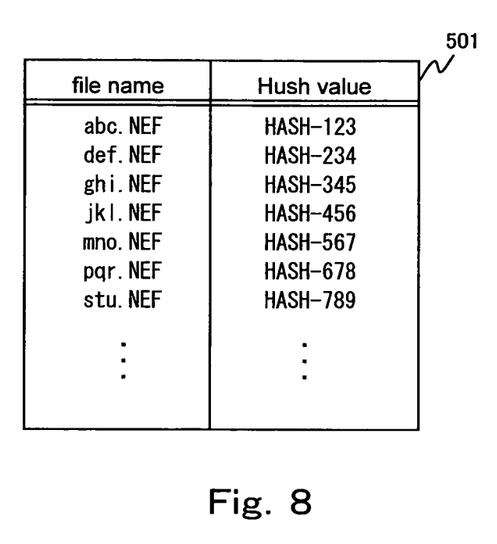
FIG. 8 is an explanatory diagram showing an example of a corresponding table.

The corresponding table generation part 402 generates the corresponding table 501 representing correspondence between the file name and the Hash value as shown in FIG. 8, and outputs the table to the storing part 109 as a text file. The corresponding table 501 of FIG. 8 sequentially describes the RAW files having the attribute name of NEF, and the identification data (Hash value) corresponding to each of the files. For example, the Hash value of the RAW file (abc.NEF) is found to be HASH-123.

The storing part 109 provides the JPEG data, which is output from the data addition part 108 and has the added identification data, with the file name and stores the JPEG data into the memory card 110 as the JPEG file. Similarly, the storing part 109 also provides the RAW data, which is output from the RAW data temporary storage part 104, with the file name and stores the RAW data into the memory card 110 as the RAW file. Further, the storing part 109 stores the corresponding table, which is output from the corresponding table generation part 402, as shown in FIG. 8, into the memory card 110 as a text file.

Here, a different point from the first embodiment is that the RAW file, which the storing part 109 stores into the memory card 110, does not have the identification data added thereto. Instead, the storing part 109 stores the text file, which describes the identification data (Hash value) corresponding to the RAW file stored in the memory card 110, into the memory card 110. Here, when the RAW file is already stored in the memory card 110 and the text file of the Hash value corresponding table is already generated and stored in the memory card 110, the Hash value corresponding table is updated by the process reading out the already generated text file and additionally writing the Hash value corresponding to the RAW file to be stored newly, and is stored again into the memory card 110 as the same text file. That is, even when a plurality of RAW files is stored in the memory card 110, there exists only one unique text file, in which the Hash value corresponding table is written.

Further, even when the JPEG file is stored in the folder or the storage medium different from that of the RAW file, there exists only one unique text file, in which the Hash value corresponding table is written, and the location storing the text file is stored in a location preliminarily determined by the imaging apparatus 401. Moreover, when the application side stores the JPEG file and the RAW file newly, it is necessary to update the text file, in which the Hash value corresponding table is written, by writing the new storing position. Note that, in copying or moving of the file, it is necessary to perform the copying or moving using dedicated administration software, and to remove or add the file name, which is not moved from the Hash value corresponding table, according to the JPEG file or the RAW file to be copied or moved together.

Figure 9:
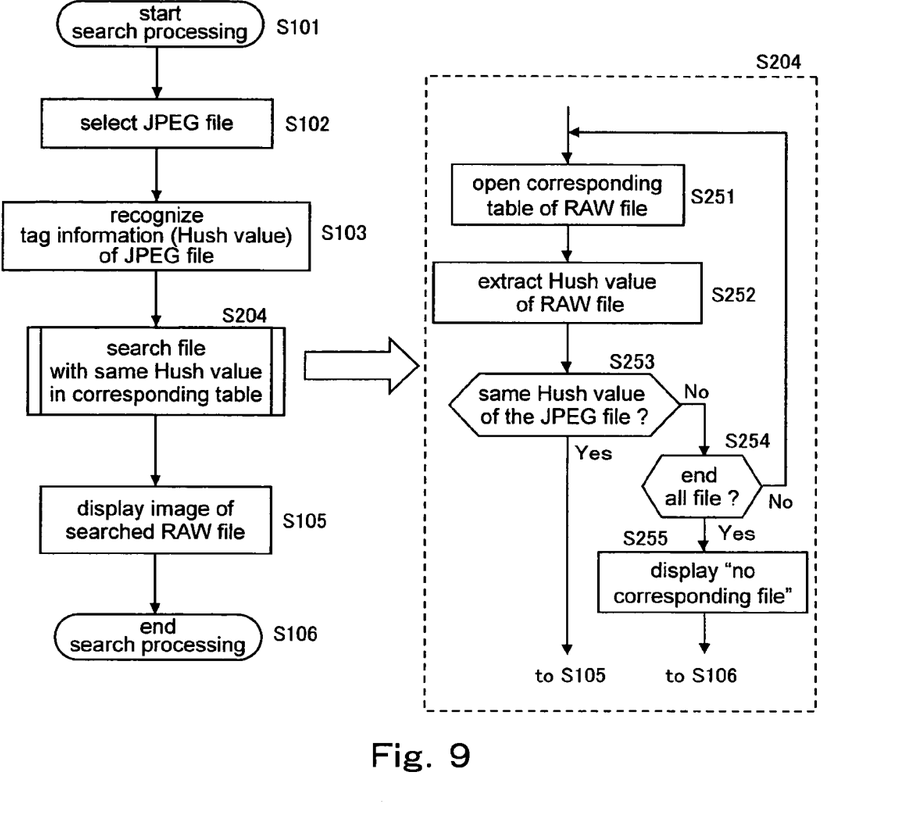
FIG. 9 is a flow chart showing search processing for a RAW file in the second embodiment.

Next, the data processing program will be described for a case of using the image processing software in the personal computer, with reference to the flow chart in FIG. 9. Note that, as a precondition, the folder, which stores the RAW file and the text file describing the corresponding table of the RAW file and the Hash value, is assumed to be already set as an initial value of the data processing program. Further, the JPEG file, which is handled in the data processing program of the present embodiment, is assumed to have the Hash value, which is generated as the identification data and added thereto as the tag information, and to be stored in the storage medium, when an image is shot by the imaging apparatus 101 described in the first embodiment. Note that the Hash value is not added to the RAW file. In the following, the search processing for the RAW file will be described sequentially. In FIG. 9, the step having the same step number as that in FIG. 6 performs the same processing and repeated description thereof will be omitted. Steps S101 to S103 are the same steps as those in FIG. 6, and set up the image processing software in the personal computer, specify the JPEG file requiring the search for the RAW file thereof, and recognize the tag information (Hash value) of the specified JPEG file, respectively.

(Step S204) Open the text file of the corresponding table in the predetermined RAW file folder, and search for the RAW file having the added Hash value which is the same as that recognized in Step S103.

Here, the file search of Step S204 will be described in detail.

(Step S251) Open up the text file of the corresponding table.

(Step S252) Extract the Hash value of the read-out RAW file.

(Step S253) Determine whether or not the extracted Hash value is the same as the Hash value of the JPEG file, which is recognized in Step S103. If the Hash values are the same, return to Step S105. If the Hash values are different, go to Step S254.

(Step S254) Determine whether or not the Hash value has been checked for all the RAW files in the corresponding table. If the Hash value has been checked for all the RAW files, got to Step S255, and, if the Hash value has not checked for all the RAW files, return to Step S251 and check the Hash value of the next RAW file.

(Step S255) When the RAW file corresponding to the Hash value is not found even after the Hash value has been checked for all the RAW files, display "No corresponding file" and go to Step S106 for terminating the search processing.

Figure 6:
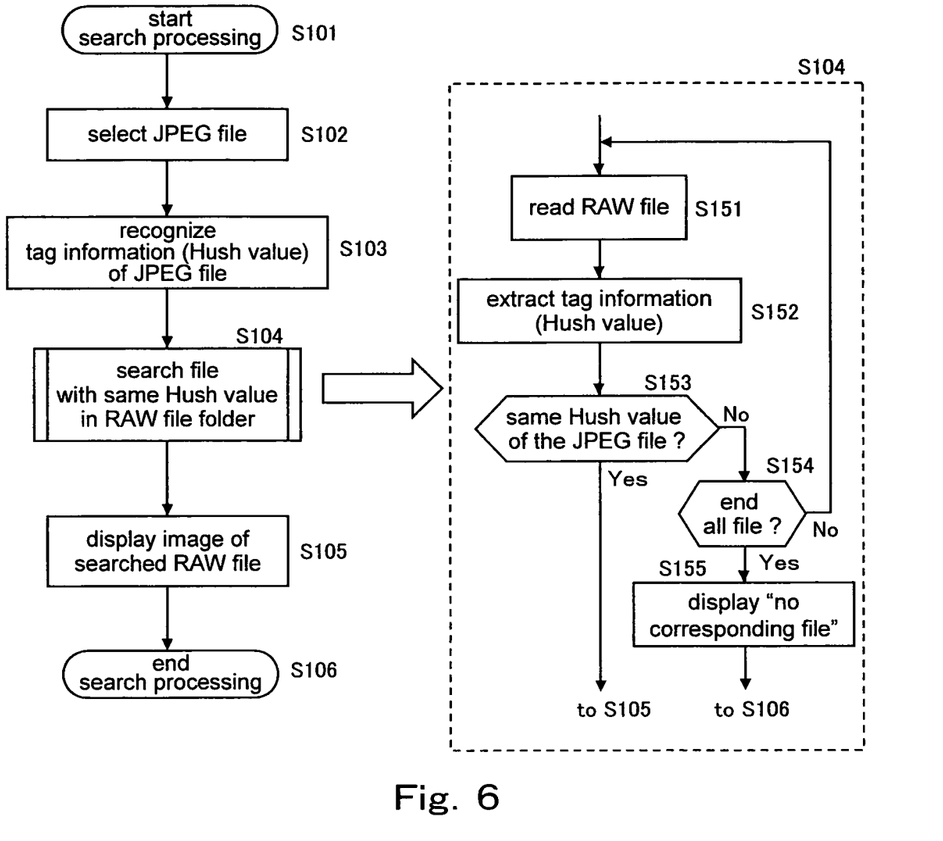
FIG. 6 is a flow chart showing search processing for a RAW file in the first embodiment.

The processing in Steps S105 to S106 is the same as that in the flow chart of FIG. 6, and opens the RAW file which has been identified in the search, displays the image thereof, and terminates the search processing.

In this manner, when the JPEG file, which is displayed using the image processing software in the personal computer, is required to be subjected to the image processing such as the color conversion and the γ-conversion, it is possible easily to find the RAW file which is the original of the JPEG file being displayed. As a result, it is possible easily to use the RAW file, which has little image degradation, in the image processing, and it is not necessary to search for the RAW file while confirming the file name or the generation date and time, resulting in the improvement of operationality.

In particular, it is not necessary to provide the same file name to the JPEG file and the RAW file, and it is possible easily to find the RAW file, which is the original of the JPEG file, even when the file name has been altered afterward.

Note that, while the present embodiment has been described for the case of handling the image data, the present embodiment can be applied also to the case of the audio data, the program data, or the like, as described in the first embodiment.

Moreover, for example, when the JPEG file C is further generated by the conversion of the JPEG file B, which has the identification data (HASH-A) generated from the RAW data A in the shooting, the JPEG file C may be generated to have the identification data (HASH-B) which is generated from the JPEG file B. Alternatively, when the identification data is added to the JPEG file C, the identification data (HASH-AB), which describes the identification data generated from both of the identification data (HASH-A) generated from the RAW data A and the identification data (HASH-B) generated from the JPEG file B, may be added to the JPEG file C. Similarly, when the JPEG file D is further generated by the further conversion of the JPEG file C, the identification data (HASH-ABC) describing the three sets of identification data generated from the RAW data A, JPEG file B, and JPEG file C is added to the JPEG file D. Thereby, not limited to the RAW file, it is possible to search for the original RAW file or the JPEG file by specifying how many generations ago the JPEG file is. For example, the search for the JPEG file, which is one generation ago, may be carried out by the search for the JPEG file, to which the identification data (HASH-AB) is added, and the search for the JPEG file, which is two generations ago, may be carried out by the search for the JPEG file, to which the identification data (HASH-A) is added.

As described hereinabove in each of the embodiments, the data processing apparatus, the imaging apparatus, and the data processing program can identify first data, which is the original of second data, easily from the second data, by adding the identification data, which depends on the first data, to the second data generated from the first data by conversion.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A data processing apparatus, comprising:
a searching part identifying first image data which is an original of second image data by use of a message digest being added to the second image data generated by another data processing apparatus including a data conversion part converting the first image data into the second image data;
a cryptographic hash function executing part executing a cryptographic hash function to the first image data being input;
a recording part recording the first image data and recording the second image data to which the message digest generated in the cryptographic hash function executing part is added; and
a corresponding table generation part generating a corresponding table representing correspondence among the first image data, the second image data, and the message digest, and recording the corresponding table with the first image data and the second image data, wherein
the searching part identifies the first image data including a message digest which is the same as that of the second image data by referring to the corresponding table generated by the corresponding table generation part.

2. The data processing apparatus according to claim 1, wherein
the recording part records both the first image data and the second image data to which the message digest generated in the cryptographic hash function executing part is added.

3. The data processing apparatus according to claim claim 1, wherein
the cryptographic hash function executing part generates the message digest by executing a predetermined function having an algorithm name selected from the group consisting of Message Digest Algorithm 5, Message Digest Algorithm 4, Message Digest Algorithm 2, and Secure Hash Algorithm.

4. The data processing apparatus according to claim 1 wherein:
the data conversion part converts, as new first image data, the second image data being added the message digest generated by the cryptographic hash function executing part to new second image data,
the cryptographic hash function executing part generates a second message digest by executing the cryptographic hash function with the new first image data as an input, and
the recording part records the new first image data and hierarchically records the new second image data to which the message digest and the second message digest generated in the cryptographic hash function executing part is added.

5. The data processing apparatus according to claim 1, wherein
the recording part records a plurality of the second image data to which the same message digest generated in the cryptographic hash function executing part is added respectively, when the data conversion part generates the plurality of the second image data from the same first image data.

6. A non-transitory computer-readable medium having computer-executable instructions for performing
- a searching step identifying first image data which is an original of second image data by reading a message digest being added to the second image data generated by a data processing apparatus including a data conversion part converting the first image data into the second image data;
- a cryptographic hash function executing step executing a cryptographic hash function with the first image data as an input;
- a recording step recording the first image data and recording the second image data to which the message digest generated in the cryptographic hash function executing part is added; and
- a corresponding table generation step generating a corresponding table representing correspondence among the first image data, the second image data, and the message digest, and recording the corresponding table with the first image data and the second image data,
- wherein the searching step identifies the first image data including a message digest which is the same as that of the second image data by referring to the corresponding table generated by the corresponding table generation step.

7. The non-transitory computer-readable medium according to claim 6, wherein
- the recording step records both the first image data and the second image data to which the message digest generated in the cryptographic hash function executing step is added.

8. The non-transitory computer-readable medium according to claim 6, wherein
- the message digest is generated by executing a predetermined function having an algorithm name selected from the group consisting of Message Digest Algorithm 5, Message Digest Algorithm 4, Message Digest Algorithm 2, and Secure Hash Algorithm, and
- the message digest being generated and the algorithm name are added and recorded to the second image data.

9. The non-transitory computer-readable medium according to claim 6, wherein:
- the data conversion step converts, as new first image data, the second image data being added the message digest generated by the cryptographic hash function executing step to new second image data,
- the cryptographic hash function executing step generates a second message digest by executing the cryptographic hash function with the new first image data as an input, and
- the recording step records the new first image data and hierarchically records the new second image data to which the message digest and the second message digest generated in the cryptographic hash function executing step is added.

10. The non-transitory computer-readable medium according to claim 6, wherein
- the recording step records a plurality of the second image data to which the same message digest generated in the cryptographic hash function executing step is added respectively, when the data conversion step generates the plurality of the second image data from the same first image data.

* * * * *